(12) United States Patent
Kawanishi et al.

(10) Patent No.: US 12,472,989 B2
(45) Date of Patent: Nov. 18, 2025

(54) MOTION PREDICTION DEVICE AND MOTION PREDICTION METHOD

(71) Applicant: TOYOTA JIDOSHA KABUSHIKI KAISHA, Toyota (JP)

(72) Inventors: Ray Kawanishi, Tokyo-to (JP); Katsuhiro Sakai, Kawasaki (JP); Taisuke Sugaiwa, Chofu (JP); Hiroshi Nakamura, Chofu (JP); Naoki Nagasaka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 18/353,223

(22) Filed: Jul. 17, 2023

(65) Prior Publication Data

US 2024/0092399 A1    Mar. 21, 2024

(30) Foreign Application Priority Data

Sep. 21, 2022   (JP) .................. 2022-150045

(51) Int. Cl.
*B60W 60/00* (2020.01)
*B60W 50/00* (2006.01)

(52) U.S. Cl.
CPC .. *B60W 60/00274* (2020.02); *B60W 50/0097* (2013.01); *B60W 2554/4045* (2020.02); *B60W 2555/60* (2020.02)

(58) Field of Classification Search
CPC ............ B60W 30/08; B60W 30/095; B60W 30/0956; B60W 30/18145; B60W 30/18159; B60W 40/02; B60W 40/04; B60W 50/0097; B60W 50/14; B60W 60/00274; B60W 2554/4029; B60W 2554/4045; B60W 2554/80; B60W 2555/60; G06V 20/58
See application file for complete search history.

(56) References Cited

U.S. PATENT DOCUMENTS

| 2012/0059789 A1* | 3/2012 | Sakai ................ G08G 1/166 706/52 |
| 2019/0389464 A1* | 12/2019 | Nanri ............ B60W 60/00274 |
| 2021/0114589 A1 | 4/2021 | Komuro et al. |
| 2021/0118289 A1 | 4/2021 | Jeevan |
| 2022/0242403 A1* | 8/2022 | Horita ................. B60W 30/08 |

FOREIGN PATENT DOCUMENTS

| JP | 2010-267211 A | 11/2010 |
| JP | 2019-220054 A | 12/2019 |
| JP | 2020-194309 A | 12/2020 |
| JP | 2021-068015 A | 4/2021 |
| JP | 2021-068423 A | 4/2021 |

\* cited by examiner

*Primary Examiner* — Peter D Nolan
*Assistant Examiner* — Ce Li Li
(74) *Attorney, Agent, or Firm* — Sughrue Mion, PLLC

(57) ABSTRACT

A motion prediction device detecting, from surrounding data representing a situation in a predetermined range of surroundings of a vehicle, a traffic participant existing in the predetermined range, determining whether there is a blind area not represented in the surrounding data in the predetermined range, when it is determined that there is a blind area presuming that there is a virtual traffic participant in the blind area, and predicting motion of the traffic participant caused by the presence of the virtual traffic participant.

9 Claims, 4 Drawing Sheets

MOTION PREDICTION DEVICE AND MOTION PREDICTION METHOD

FIELD

The present disclosure relates to a motion prediction device and a motion prediction method for predicting motion of the traffic participant in surroundings of a vehicle.

BACKGROUND

It is important for a safe operation of a vehicle to suitably predict motion of a traffic participant in surroundings of the vehicle and keep distance to a future position of the traffic participant by controlling travel of the vehicle in autonomous driving and by drawing the attention of (alert) the driver in manual driving.

For example, a future behavior estimation device described in Japanese Unexamined Patent Publication No. 2021-068423 recognizes a position of a traffic participant, determines a provisional goal which the traffic participant intends to reach in the future based on the recognition result, and simulates a movement process of the traffic participant toward the provisional goal by using a movement model.

SUMMARY

The surroundings of a vehicle sometimes include a blind area blocked by an object such as a structure or other vehicle where a traffic participant cannot be detected by a surrounding sensor of the vehicle. Prediction of a future situation estimated based only on traffic participants detected by a surrounding sensor may sometimes not be possible to suitably cover the situation caused by a traffic participant existing in the blind area.

It is an object of the present disclosure to provide a motion prediction device that can suitably predict motion of a traffic participant existing in surroundings of a vehicle.

The gist of the present disclosure is as follows:

(1) A motion prediction device comprising a processor configured to:
  detect, from surrounding data representing a situation in a predetermined range of surroundings of a vehicle, a traffic participant existing in the predetermined range,
  determine whether there is a blind area not represented in the surrounding data in the predetermined range,
  presume, when it is determined that there is a blind area, that there is a virtual traffic participant in the blind area, and
  predict motion of the traffic participant caused by the presence of the virtual traffic participant.

(2) The motion prediction device according to above item (1), wherein the processor in prediction predicts motion of the virtual traffic participant in accordance with traffic rules applied to the blind area in which the presence of the virtual traffic participant is presumed and predicts the motion of the traffic participant caused by the presence of the virtual traffic participant after the predicted motion.

(3) The motion prediction device according to the above item (1) or (2), wherein the presumption unit presumes that there is a virtual traffic participant in the blind area with a possibility of affecting the path of movement of the traffic participant larger than a predetermined value among a plurality of virtual traffic participants presumable in the blind area.

(4) A motion prediction method comprising having a motion prediction device predicting a motion of a traffic participant present in surroundings of a vehicle execute a process comprising:
  detecting, from surrounding data representing a situation in a predetermined range of surroundings of the vehicle, a traffic participant existing in the predetermined range,
  determining whether there is a blind area not represented in the surrounding data in the predetermined range,
  presuming, when it is determined that there is a blind area, that there is a virtual traffic participant in the blind area, and
  predicting motion of the traffic participant caused by the presence of the virtual traffic participant.

(5) A non-transitory computer-readable medium having a computer program for motion prediction stored therein, the computer program causing a computer mounted on a vehicle to execute a process comprising:
  detecting, from surrounding data representing a situation in a predetermined range of surroundings of a vehicle, a traffic participant existing in the predetermined range,
  determining whether there is a blind area not represented in the surrounding data in the predetermined range,
  presuming, when it is determined that there is a blind area, that there is a virtual traffic participant in the blind area, and
  predicting motion of the traffic participant caused by the presence of the virtual traffic participant.

The motion prediction device according to the present disclosure can suitably predict motion of a traffic participant existing in surroundings of a vehicle.

DESCRIPTION OF EMBODIMENTS

A motion prediction device that can suitably predict motion of a traffic participant in surroundings of a vehicle will now be described in detail in reference to the attached drawings. The motion prediction device detects, from surrounding data representing a situation in a predetermined range of the surroundings of a vehicle, a traffic participant existing in the predetermined range. The predetermined range is a range of detection of a surrounding sensor generating surrounding data. The motion prediction device also determines whether there is a blind area not represented in the surrounding data in the predetermined range. The motion prediction device presumes, when it is determined that there is a blind area, that there is a virtual traffic participant in the blind area. The motion prediction device also predicts motion of the traffic participant caused by the presence of the virtual traffic participant.

Figure 1:
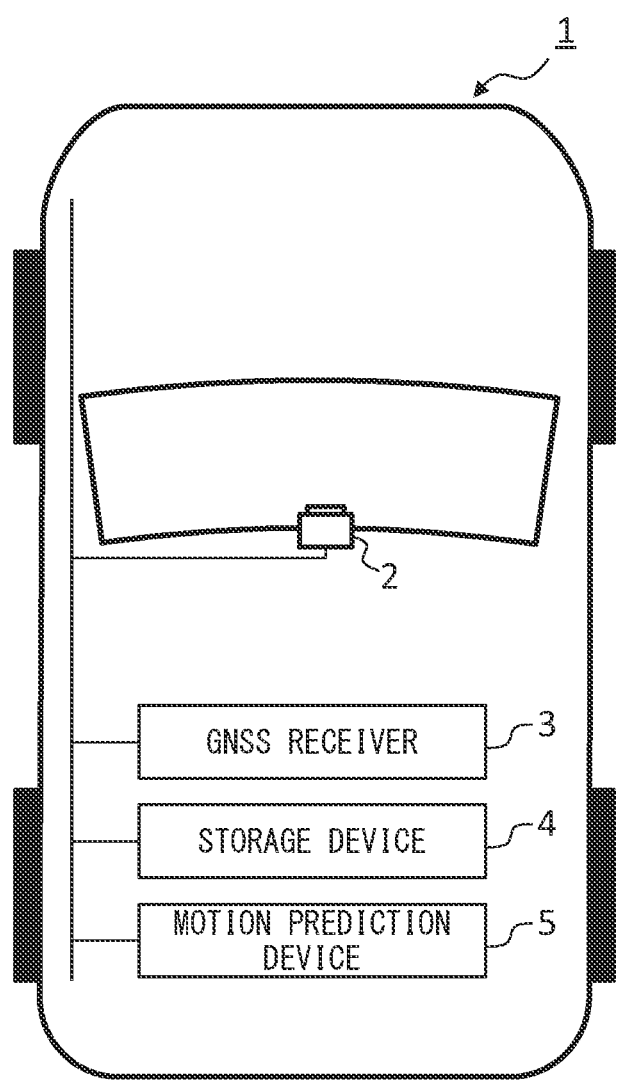
FIG. 1 schematically illustrates the configuration of a vehicle equipped with a motion prediction device.

FIG. 1 schematically illustrates the configuration of a vehicle in which a motion prediction device is mounted.

The vehicle 1 includes a surrounding sensor 2, a GNSS (global navigation satellite system) receiver 3, a storage device 4, and a motion prediction device 5. The surrounding sensor 2, the GNSS receiver 3, and the storage device 4 are connected to the motion prediction device 5 via an in-vehicle network conforming to a standard, such as a controller area network, so that they can communicate with each other.

The surrounding sensor 2 generates surrounding data in which the situation of surroundings of the vehicle 1 is represented. The surrounding sensor 2 has a LiDAR (light detection and ranging) sensor generating as surrounding data a range image whose pixels each have a value corresponding to the distance to an object represented in the pixels based on the situation of the surroundings of the vehicle 1. The surrounding sensor 2 is, for example, mounted in a front and upper area in the interior of the vehicle and oriented forward. The surrounding sensor 2 outputs a surrounding distance image as surrounding data representing the situation of surroundings of the vehicle 1 through a windshield every predetermined capturing period (e.g., 1/30 to 1/10 seconds). The vehicle 1 may also have, as surrounding sensor 2, a sensor other than a lidar sensor, for example, a surrounding camera outputting a surrounding image in which the situation of the surroundings of the vehicle 1 is represented. The surrounding camera includes a two-dimensional detector constructed from an array of optoelectronic transducers, such as CCD or C-MOS, having sensitivity to visible light and a focusing optical system that forms an image of a target area on the two-dimensional detector.

The GNSS receiver 3 receives GNSS signals from GNSS satellites at predetermined intervals and determines the position of the vehicle 1 based on the received GNSS signals. The GNSS receiver 3 outputs positioning signals each indicating the result of determination of the position of the vehicle 1 based on the GNSS signals to the motion prediction device 5 via the in-vehicle network at predetermined intervals.

The storage device 4, which is an example of a storage unit, includes, for example, a hard disk drive or a nonvolatile semiconductor memory. The storage device 4 stores map data including information relating to a lane line or other features and information representing traffic rules which are applied in association with their positions. The traffic rules applied to a certain position represent, for example, the method of travel which every traffic participant at that position is required to follow. The traffic rules may include a rule for vehicles such as a selection of a travel lane for traveling and not obstructing passage of pedestrians and a rule for a pedestrian such as walking on the sidewalk and crossing a road at a cross walk.

The motion prediction device 5 detects a traffic participant in a predetermined range from the surrounding data generated by the surrounding sensor 2. The motion prediction device 5 also determines whether there is a blind area not represented in the surrounding data in a predetermined range and presumes, when it is determined that there is a blind area, that there is a virtual traffic participant. The motion prediction device 5 also predicts motion of the traffic participant caused by the presence of the virtual traffic participant.

Figure 2:
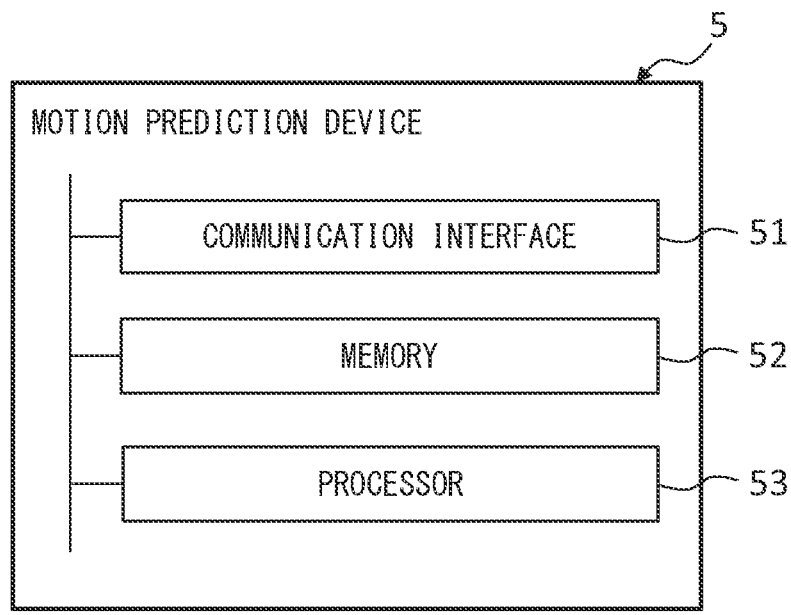
FIG. 2 schematically illustrates the hardware of the motion prediction device.

FIG. 2 schematically illustrates the hardware of the motion prediction device 5. The motion prediction device 5 includes a communication interface 51, a memory 52, and a processor 53.

The communication interface 51, which is an example of a communication unit, includes a communication interface circuit for connecting the motion prediction device 5 to the in-vehicle network. The communication interface 51 provides received data to the processor 53. The communication interface 51 also outputs data provided from the processor 53 to an external device.

The memory 52 includes volatile and nonvolatile semiconductor memories. The memory 52 contains various types of data used for processing by the processor 53, such as parameters of a classifier for detecting a traffic participant from surrounding data. The memory 52 also contains various application programs such as a program for predicting motion to execute a process of motion prediction.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 3:
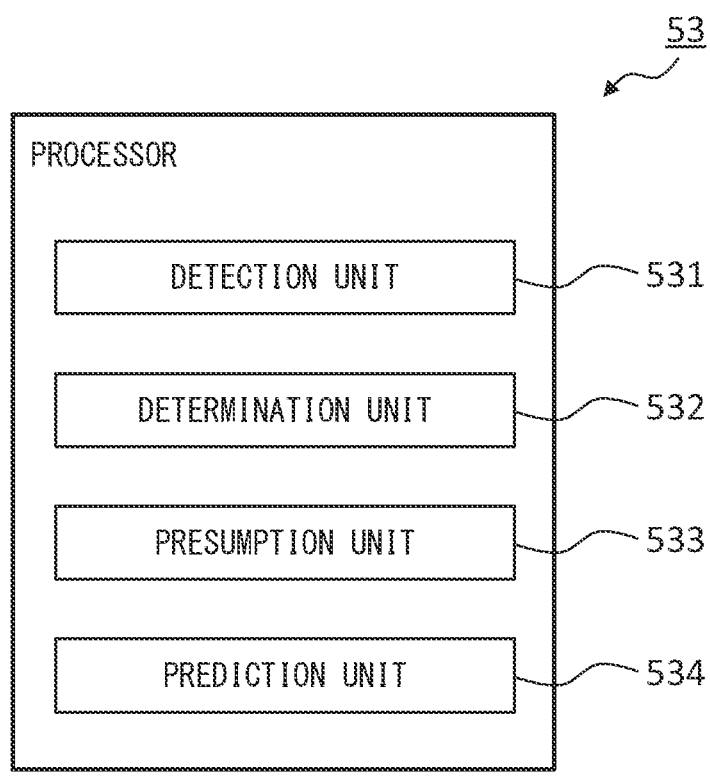
FIG. 3 is a functional block diagram of a processor provided at the motion prediction device.
Figure 4:
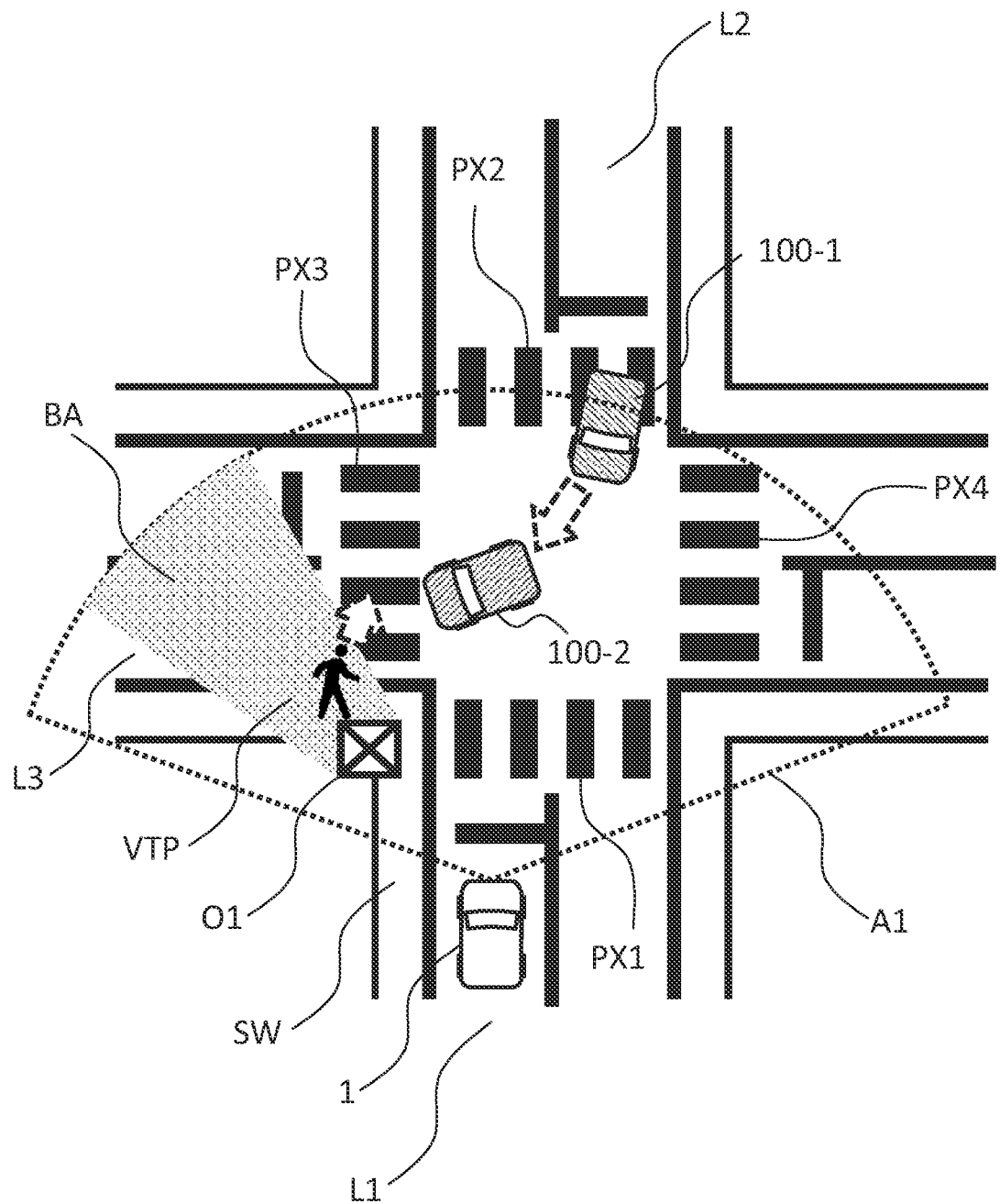
FIG. 4 is a schematic view explaining an example of motion prediction.

FIG. 3 is a functional block diagram of the processor 53 included in the motion prediction device 5. FIG. 4 is a schematic view explaining an example of motion prediction.

As its functional blocks, the processor 53 of the motion prediction device 5 includes a detection unit 531, a determination unit 532, a presumption unit 533, and a prediction unit 534. These units included in the processor 53 are functional modules implemented by a program executed on the processor 53. The computer program for achieving the functions of the units of the processor 53 may be provided in a form recorded on a computer-readable and portable medium, such as a semiconductor memory, a magnetic recording medium, or an optical recording medium. Alternatively, the units included in the processor 53 may be implemented in the motion prediction device 5 as separate integrated circuits, microprocessors, or firmware.

The detection unit 531 acquires surrounding data representing the situation in a predetermined range of the surroundings of the vehicle 1 from the surrounding sensor 2 through the communication interface 51. The detection unit 531 detects a traffic participant existing in the predetermined range from the surrounding data.

The detection unit 531 detects a traffic participant existing in the predetermined range by inputting the received surrounding data into a classifier that has been trained in advance to detect a traffic participant such as another vehicle and a pedestrian.

The classifier may be, for example, a convolutional neural network (CNN) including a plurality of convolution layers connected in series from the input toward the output. A CNN that has been trained in accordance with a predetermined training technique such as backpropagation by using large numbers of data including a traffic participant as training data in advance operates as a classifier detecting a traffic participant from the data. A machine learning algorithm such as a support vector machine (SVM) or AdaBoost may be used for the classifier. For example, an SVM that has been trained to determine the support vectors for discriminating whether a traffic participant is included in various areas on the surrounding data operates as a classifier for detecting a traffic participant.

The detection unit 531 may also detect features in the surroundings of the vehicle 1 by inputting the received surrounding data into a classifier that has been trained in advance to detect features such as road signs, road markings, and roadside trees. A CNN that has been trained by using training data including features can operate as the classifier. The detection unit 531 may detect a traffic participant and features from the surrounding data by using a CNN that has been trained by using training data including a traffic participant and training data including features as a classifier.

In the example of FIG. 4, the surrounding data represents the situation of a predetermined range A1 of the surroundings of the vehicle 1 traveling in a lane L1. The other vehicle 100-1 entering an intersection from a lane L2 and traveling toward a lane L3 is an example of a traffic participant detected from the surrounding data. Cross walks PX1-PX4 are examples of features detected from the surrounding data.

The determination unit 532 determines whether there is a blind area not represented in surrounding data in a predetermined range.

For example, the determination unit 532 compares features represented in feature information acquired from the storage device 4 corresponding the position and orientation indicated in the positioning signals received from the GNSS receiver 3 with features detected from the surrounding data. When any features represented in the feature information is not included in the features detected from the surrounding data, the determination unit 532 determines that there is a blind area caused by an obstacle between a feature not included in the features detected from the surrounding data and the vehicle position and that the ground object is not represented in the surrounding data. At this time, the determination unit 532 estimates the area, among the predetermined range, behind the object represented at a position where the feature in the surrounding data should be detected from the position of the vehicle las the range of the blind area.

Regarding the example of FIG. 4, in the predetermined range A1 of the surroundings of the vehicle 1, the situation behind an obstructing object O1 is blocked by the obstructing object O1 and is not represented in the surrounding data. Therefore, in the predetermined range A1, the area behind the obstructing object O1 is a blind area BA for the vehicle 1. The determination unit 532 identifies orientations from the surrounding sensor 2 toward the left and right outer edges in the range where the obstructing object O1 is represented and defines an area with a distance from the surrounding sensor 2 longer than the obstructing object O1 in the area sandwiched between the identified orientations as the blind area BA.

Alternatively, the determination unit 532 may determine the presence of a blind area based on the distances indicated in pixels of the surrounding data. For example, in the case that the surrounding sensor 2 is a LiDAR, the road surface and other background on a concentric circle centered about the sensor position is indicated by substantially the same distances in a distance image outputted as the surrounding data. Among the pixels corresponding to such a concentric circumference, the pixels indicated by distances closer than the background can be understood to correspond to the foreground, not the background (for example, a feature or traffic participant). In particular, pixels indicated by distances with large differences from the distances to the background correspond to other objects concealing something behind them and will form a blind area in a high probability. Therefore, the determination unit 532 may determine that there is a blind area in the surrounding data when the size of the area of consecutive pixels with differences from the distances to the background larger than a predetermined distance threshold is larger than a predetermined area threshold.

The presumption unit 533 acquires the result of determination of whether there is a blind area in the surrounding data and, when there is a blind area present, information representing that range from the determination unit 532. When there is a blind area in the surrounding data, the presumption unit 533 presumes that there is a virtual traffic participant in the blind area. A virtual traffic participant is a traffic participant presumed to be existing in a predetermined area represented in the surrounding data generated by the surrounding sensor 2 regardless of the result of detection from the surrounding data.

The presumption unit 533 can presume the presence of a pedestrian as a virtual traffic participant or a vehicle as a virtual traffic participant in the blind area. The position inside the blind area at which a virtual traffic participant is presumed to be existing may be any type of area inside a blind area such as a sidewalk, cross walk, and traffic lane. The presumption unit 533 identifies an area corresponding to a blind area on the map data and identifies a type of area contained in the identified area such as a sidewalk in reference to the position and orientation of the vehicle indicated in positioning signals received from the GNSS receiver 3 and the map data.

The presumption unit 533 may also presume the presence of a virtual traffic participant in accordance with traffic rules applied to the blind area. For example, a reference table associating the type of the area and the type of a virtual traffic participant for which presence can be presumed in the area in accordance with traffic rules applied to the area (for example a sidewalk and a pedestrian) is stored in advance in the memory 52. The presumption unit 533 presumes a virtual traffic participant present in each type of area in the blind area in reference to the reference table. For example, when it is deemed that there is a sidewalk in the blind area, the presumption unit 533 presumes the presence of a pedestrian as a virtual traffic participant on the sidewalk in reference to the reference table.

The prediction unit 534 predicts motion of a traffic participant caused by the presence of a virtual traffic participant. The prediction unit 534 may predict motion of the virtual traffic participant in accordance with traffic rules applied to the blind area in which the presence of the virtual traffic participant is presumed. In this case, the prediction unit 534 predicts motion of the traffic participant caused by the presence after predetermined motion of the virtual traffic participant. By the prediction unit 534 operating in this way, the motion prediction device 5 can suitably predict motion of the traffic participant based on the motion of the virtual traffic participant in the blind area.

In the example of FIG. 4, the presumption unit 533 can presume the presence of a vehicle as a virtual traffic participant at a position inside the lane L3 contained in the blind area BA in accordance with traffic rules applied to the blind area BA. Similarly, the presumption unit 533 can presume the presence of a pedestrian as a virtual traffic participant VTP at a position inside the sidewalk SW contained in the blind area BA.

The prediction unit 534 calculates the probability of a virtual traffic participant making in accordance with the traffic rules for each presumable motion (motion probability). The prediction unit 534 also predicts the possibility of the presence of the virtual traffic participant after the presumed motion affecting the motion of the detected traffic participant by multiplying the motion probability of the traffic participant for which presumed motion is detected being affected (influence probability) with the motion probability for each presumed motion of the virtual traffic participant. The motion probability and the influence probability may be included in the map data stored in the storage device 4 as information representing traffic rules associated with a position.

For example, the prediction unit 534 predicts the motion probability of a vehicle as the virtual traffic participant positioned inside the lane L3 traveling ahead of the traffic participant in the forward direction as, for example, 95% in accordance with traffic rules. The prediction unit 534 also sets the influence probability of motion of the traffic participant being affected by the presence of the virtual traffic participant traveling ahead in the forward direction as 10%. At this time, the prediction unit 534 predicts the possibility of the presence of the virtual traffic participant after predicted motion (other vehicle in front in the lane L3) affecting motion of the other vehicle 100-1 as 95%×10%=9.5%.

Similarly, the prediction unit 534 predicts the motion probability of a pedestrian as a virtual traffic participant positioned near the cross walk PX3 on the sidewalk SW moving to the cross walk PX3 to be for example 70% in accordance with the traffic rules. In the traffic rules, when there is a pedestrian present trying to cross the cross walk, a vehicle should stop before the cross walk so as to not obstruct passage of the pedestrian. The influence probability of motion of the vehicle being affected by the presence of a pedestrian is deemed 95%. Based on the traffic rules, the prediction unit 534 predicts the possibility of the other vehicle 100-1 traveling from the lane L2 toward the lane L3 stopping in front of the cross walk PX3 (position of other vehicle 100-2) (presence of the virtual traffic participant after predicted motion affecting motion of the other vehicle 100-1) as 70%×95%=67%.

Similarly, the prediction unit 534 predicts the motion probability of a pedestrian as a virtual traffic participant positioned at a place away from the cross walk PX3 in the sidewalk SW moving to the cross walk PX3 to be for example 20% in accordance with the traffic rules. The prediction unit 534 predicts the possibility of the presence of the virtual traffic participant after predicted motion (pedestrian walking across the cross walk PX3) affecting motion of the other vehicle 100-1 to be for example 20%×95%=19%.

When the possibility of predicted motion of a virtual traffic participant affecting the path of movement of a traffic participant detected by the detection unit 531 is a value smaller than a predetermined value (for example 30%), the presumption unit 533 may exclude the presumption of the virtual traffic participant being present. The presumption unit 533 operating in this way can decrease the processing load by omitting the process of a virtual traffic participant with a small effect on the path of movement of the traffic participant.

In the above-mentioned example, the possibility of motion predicted for a pedestrian as a virtual traffic participant positioned near the cross walk PX3 on the sidewalk SW affecting a path of movement of a traffic participant (the other vehicle 100-1) is larger than a predetermined value. Therefore, the presumption unit 533 presumes that a pedestrian as a virtual traffic participant is positioned near the cross walk PX3 in the sidewalk SW.

Figure 5:
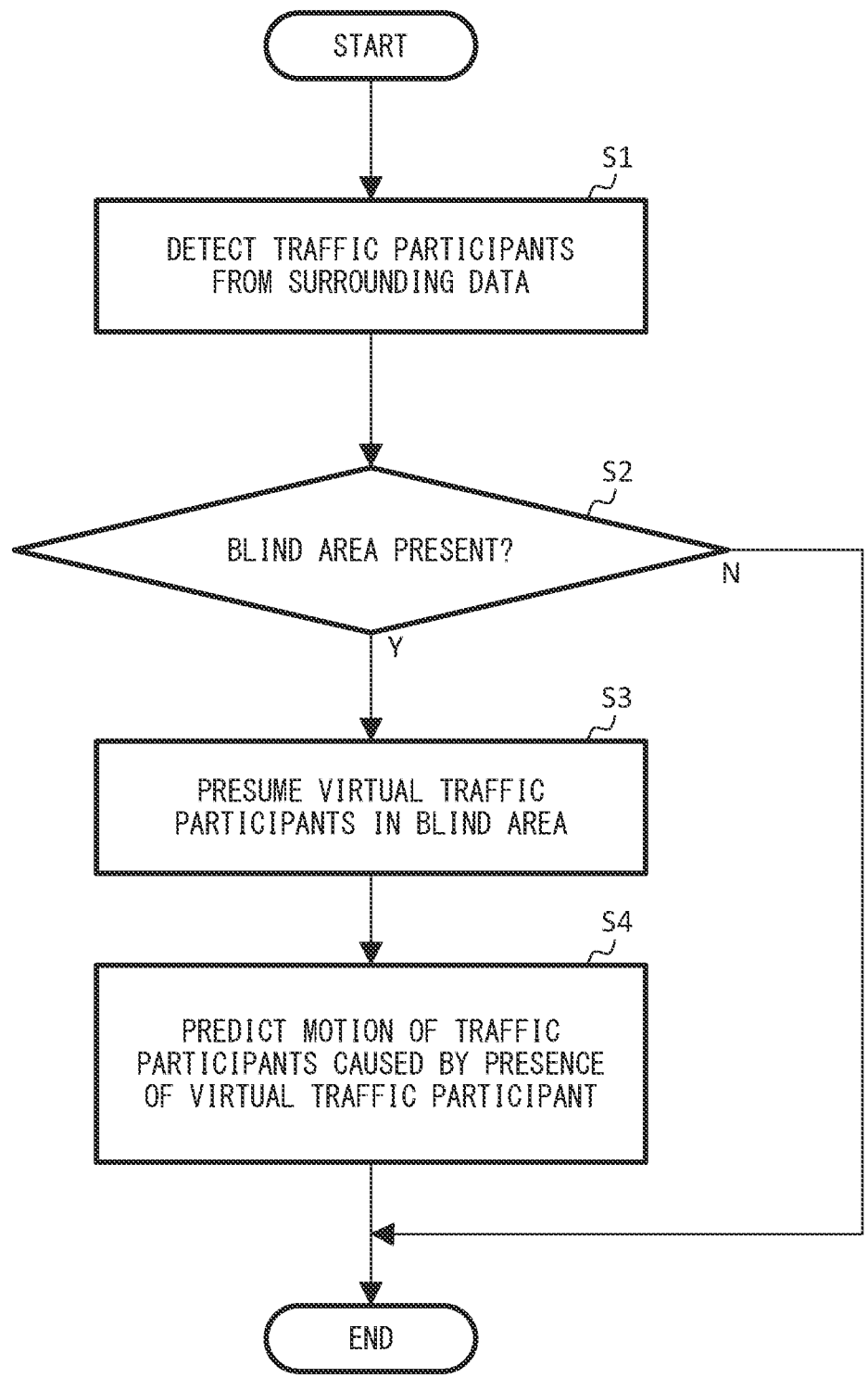
FIG. 5 is a flowchart of a process for motion prediction.

FIG. 5 is a flowchart of a process for motion prediction. The processor 53 of the motion prediction device 5 repeatedly performs the process for motion prediction described below at predetermined intervals during travel of the vehicle 1.

First, the detection unit 531 of the processor 53 of the motion prediction device 5 detects a traffic participant existing in a predetermined range of the surroundings of the vehicle 1 from the surrounding data generated by the surrounding sensor 2 (step S1).

The determination unit 532 of the processor 53 determines whether there is a blind area not represented in the surrounding data in a predetermined range (step S2). When it is determined that there is no blind area in the predetermined range (step S2: N), the determination unit 532 terminates the process for motion prediction. In this case, the processor 53 may perform a process for predicting motion of the traffic participant detected from the surrounding data without presuming a virtual traffic participant.

When it is determined there is a blind area in a predetermined range (step S2: Y), the presumption unit 533 of the processor 53 presumes that there is a virtual traffic participant in the blind area (step S3). After this, the prediction unit 534 of the processor 53 predicts motion of the traffic participant caused by the presence of the virtual traffic participant (step S4) and terminates the process for motion prediction.

Such a process for motion prediction enables the motion prediction device to suitably predict motion of the traffic participant existing in the surroundings of the vehicle.

The vehicle 1 may also have a travel controller (not shown) controlling travel of the vehicle 1 so that the distance from the vehicle 1 to a traffic participant in the surroundings keeps a suitable length. The travel controller controls travel of the vehicle 1 so that the distance from the vehicle 1 to a traffic participant with motion predicted by the motion prediction device 5 keeps a suitable length.

The vehicle 1 may have a notification device (not shown) which notifies, when the distance to an object such as a traffic participant in the surroundings of the vehicle 1 is predicted to fall lower than a predetermined interval threshold, the driver of the vehicle 1 through a display, speaker, lamp, or other communication device (not shown) mounted on the vehicle 1. The notification device notifies the driver of the vehicle 1 when the distance to a traffic participant with motion predicted by the motion prediction device 5 falls lower than a predetermined interval threshold.

In the present embodiment, FIG. 4 was used to explain the example of presuming a virtual traffic participant crossing a cross walk at an intersection and predicting motion of a traffic participant. The motion prediction device 5 of the present disclosure needless to say can also be applied to prediction of motion of a traffic participant in other road situations.

For example, assume that the vehicle 1 and a preceding vehicle traveling ahead of the vehicle 1 are trying to pass two oncoming vehicles stopped at an oncoming lane. The front side of the two oncoming vehicles stopped at the oncoming lane is a truck conveying a container. Behind the truck is a passenger car. The vehicle 1 is running at the side of the truck. The preceding vehicle is at a position straddling the lane at which the vehicle 1 is traveling and the oncoming lane to pass between the truck and passenger car, for example, so as to enter a parking lot of a store at the oncoming lane side.

The detection unit 531 of the motion prediction device 5 detects the truck, the passenger car, and the preceding vehicle existing in a predetermined range of the surroundings of the vehicle 1 from surrounding data generated by the surrounding sensor 2 mounted in the vehicle 1.

The detection range of the surrounding sensor 2 includes the container of the truck. Features such as guard rails and roadside trees at the sidewalk side of the oncoming lane behind the container cannot be detected from the surrounding data. Therefore, the determination unit 532 of the motion prediction device 5 determines that a blind area is present in a predetermined range of the surroundings of the vehicle 1.

The presumption unit 533 of the motion prediction device 5 identifies the type of an area included in the blind area in reference to the current position and orientation of the vehicle 1 represented in the map data and the latest positioning information. For example, the presumption unit 533 identifies among the blind area an area from a passenger car to a road edge (edge of lane at sidewalk side) as a bicycle lane in which traffic rules are applied prioritizing a bicycle travel. The presumption unit 533 presumes the presence of a bicycle as a virtual traffic participant in the bicycle lane in the blind area in accordance with the traffic rules.

The prediction unit 534 of the motion prediction device 5 predicts the motion probability of a bicycle as a virtual traffic participant presumed traveling in a bicycle lane in a forward direction (direction same as travel direction of oncoming lane) as being 90% in accordance with traffic rules. The prediction unit 534 of the motion prediction device 5 predicts the influence probability of the preceding vehicle stopping at a position straddling the lane in which the vehicle 1 is traveling and an oncoming lane when a bicycle as a virtual traffic participant approaches between the stopped positions of a truck and passenger car from the passenger car side by traveling on a bicycle lane in a forward direction, as being 70%. The prediction unit 534 predicts the possibility of the presence of the virtual traffic participant (bicycle) after presumed motion affecting motion of the traffic participant (preceding vehicle), by multiplying the influence probability with the motion probability, as being 63%. The vehicle 1 can suppress acceleration or decrease speed to prepare for a sudden stop of the preceding vehicle based on prediction of motion of the traffic participant (preceding vehicle) by the motion prediction device 5.

Note that those skilled in the art can apply various changes, substitutions, and modifications without departing from the spirit and scope of the present disclosure.

What is claimed is:

1. A motion prediction device comprising a processor configured to:
   detect, from surrounding data representing a situation in a predetermined range of surroundings of a vehicle, a traffic participant existing in the predetermined range,
   determine whether there is a blind area not represented in the surrounding data in the predetermined range,
   presume, when it is determined that there is the blind area, that there is a virtual traffic participant in the blind area and that a possibility, of the virtual traffic participant in the blind area affecting a path of movement of the traffic participant, is larger than a predetermined value,
   predict, based on presuming that there is the virtual traffic participant and that the possibility is larger than the predetermined value, motion of the traffic participant caused by the presence of the virtual traffic participant; and
   control physical travel of the vehicle based on the motion of the traffic participant predicted, based on presuming that there is the virtual traffic participant and that the possibility is larger than the predetermined value, as caused by the presence of the virtual traffic participant,
   wherein presuming that the possibility, of the virtual traffic participant in the blind area affecting the path of movement of the traffic participant, is larger than the predetermined value comprises determining whether a motion probability, of the traffic participant and scaled by a probability that the virtual traffic participant will follow traffic rules, is larger than the predetermined value.

2. The motion prediction device according to claim 1, wherein the processor in prediction predicts the motion of the virtual traffic participant in accordance with the traffic rules applied to the blind area in which the presence of the virtual traffic participant is presumed and predicts the motion of the traffic participant caused by the presence of the virtual traffic participant after the predicted motion.

3. The motion prediction device according to claim 1, wherein the processor in presumption presumes that there is the virtual traffic participant in the blind area with the possibility of affecting the path of movement of the traffic participant larger than a predetermined value among a plurality of virtual traffic participants presumable in the blind area.

4. The motion prediction device according to claim 3,
   wherein the plurality of virtual traffic participants comprise a pedestrian and another vehicle as respective ones of the plurality of virtual traffic participants.

5. The motion prediction device according to claim 4, wherein the another vehicle is a bicycle.

6. The motion prediction device according to claim 1,
   wherein the possibility represents a future possibility of the of the virtual traffic participant in the blind area affecting the path of movement of the traffic participant at a future time from a time at which the possibility is presumed.

7. The motion prediction device according to claim 1, wherein the virtual traffic participant is a pedestrian.

8. A motion prediction method comprising having a motion prediction device predicting a motion of a traffic participant present in surroundings of a vehicle execute a process comprising:
   detecting, from surrounding data representing a situation in a predetermined range of surroundings of the vehicle, a traffic participant existing in the predetermined range,
   determining whether there is a blind area not represented in the surrounding data in the predetermined range,
   presuming, when it is determined that there is the blind area, that there is a virtual traffic participant in the blind area and that a possibility, of the virtual traffic participant in the blind area affecting a path of movement of the traffic participant, is larger than a predetermined value,
   predicting, based on presuming that there is the virtual traffic participant and that the possibility is larger than the predetermined value, motion of the traffic participant caused by the presence of the virtual traffic participant; and
   controlling physical travel of the vehicle based on the motion of the traffic participant predicted, based on presuming that there is the virtual traffic participant and that the possibility is larger than the predetermined value, as caused by the presence of the virtual traffic participant,
   wherein presuming that the possibility, of the virtual traffic participant in the blind area affecting the path of movement of the traffic participant, is larger than the predetermined value comprises determining whether a motion probability, of the traffic participant and scaled by a probability that the virtual traffic participant will follow traffic rules, is larger than the predetermined value.

9. A non-transitory computer-readable medium having a computer program for motion prediction stored therein, the computer program causing a computer mounted on the vehicle to execute a process comprising:
   detecting, from surrounding data representing a situation in a predetermined range of surroundings of a vehicle, a traffic participant existing in the predetermined range,
   determining whether there is a blind area not represented in the surrounding data in the predetermined range, presuming, when it is determined that there is the blind area, that there is a virtual traffic participant in the blind area and that a possibility, of the virtual traffic participant in the blind area affecting a path of movement of the traffic participant, is larger than a predetermined value, predicting, based on presuming that there is the virtual traffic participant and that the possibility is larger than the predetermined value, motion of the traffic participant caused by the presence of the virtual traffic participant; and controlling physical travel of the vehicle based on the motion of the traffic participant predicted, based on presuming that there is the virtual traffic participant and that the possibility is larger than the predetermined value, as caused by the presence of the virtual traffic participant, wherein presuming that the possibility, of the virtual traffic participant in the blind area affecting the path of movement of the traffic participant, is larger than the predetermined value comprises determining whether a motion probability, of the traffic participant and scaled by a probability that the virtual traffic participant will follow traffic rules, is larger than the predetermined value.

* * * * *